(12) United States Patent
Harada

(10) Patent No.: US 6,392,819 B1
(45) Date of Patent: May 21, 2002

(54) OBJECTIVE LENS AND FABRICATION METHOD THEREOF

(75) Inventor: Toshiaki Harada, Yao (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 09/566,539

(22) Filed: May 8, 2000

(30) Foreign Application Priority Data

May 11, 1999 (JP) .............................. 11-129535
Jun. 18, 1999 (JP) .............................. 11-173065

(51) Int. Cl.[7] .......................... G02B 13/18; G02B 9/00; G02B 7/02; G01B 11/26
(52) U.S. Cl. ....................... 359/719; 359/796; 359/813; 359/900; 356/153
(58) Field of Search .................. 359/719, 819, 359/796, 813, 827; 356/150, 153, 154; 369/112.08

(56) References Cited

U.S. PATENT DOCUMENTS 6,055,113 A * 5/2000 Yamamoto et al. ......... 359/661

FOREIGN PATENT DOCUMENTS

| JP | 7-220286 | 8/1995 | ............ G11B/7/08 |
| JP | 10-255304 | 9/1998 | ............ G11B/7/135 |
| JP | 2001004891 A | * 1/2001 | ............ G02B/7/02 |

* cited by examiner

*Primary Examiner*—Georgia Epps
*Assistant Examiner*—David N. Spector
(74) *Attorney, Agent, or Firm*—Dike, Bronstein, Roberts & Cushman-IP Group; David G. Conlin; George W. Hartnell, III

(57) ABSTRACT

A method of fabricating an objective lens includes the steps of attaching a first lens to a first holder, adjusting an angle between the optical axis of the first lens and the optical axis of a second lens while sliding the second lens on a sphere, and attaching the second lens to a second holder so that the angle becomes 0°, forming contact between first and second planes, sliding the second holder with respect to the first holder in a state where the first and second planes are in contact so that the optical axis of the first lens matches the optical axis of the second lens to carry out decentration adjustment, and fixing the second holder subjected to decentration adjustment with respect to the first holder.

16 Claims, 9 Drawing Sheets

OBJECTIVE LENS AND FABRICATION METHOD THEREOF

BACKGROUND OF THE INVENTION

1. Field of the Invention

The present invention relates to an objective lens, and a method of fabricating such an objective lens. Particularly, the present invention relates to an objective lens as the optical pickup lens for writing/reading information to/from an optical recording medium such as optical disks and magneto-optical disks, and a method of fabricating such an objective lens.

2. Description of the Background Art

As conventional information recording media, various optical recording media such as optical disks, magneto-optical disks and optical cards are proposed. The so-called optical pickup that directs light onto an optical recording medium is employed as the system of writing/reading information to/from such an optical recording medium.

In optical pickup, the light directed onto the optical recording medium is collected by an objective lens, and the focus is located on the plane of the optical recording medium. In this system, the diameter of the focused light beam can be reduced by increasing the numerical aperture (NA) of the objective lens to improve the signal recording density of the optical recording medium.

When the numerical aperture is to be increased with the objective lens formed of one lens, i.e., the so-called single lens, the refractive power must be increased. The rate of curvature of the objective lens becomes smaller as the refractive power is increased, so that the positioning accuracy of the refractive planes with respect to each other must be improved. Therefore, increase of the numerical aperture was limited to approximately 0.6 with the single lens.

In contrast to the single lens, the numerical aperture can be increased with the so-called two-lens, i.e. a group formed of two lenses. The two-lens will be described in the following.

FIG. 16 is a schematic diagram of an objective lens formed of the conventional two-lens. Referring to FIG. 16, the objective lens is formed of a two-lens 60. Two-lens 60 includes a first lens 61 and a second lens 62. First lens 61 includes a first plane 63 on which the laser beam emitted from a semiconductor laser is incident, and a second plane 64 facing second lens 62. Second lens 62 includes a third plane 65 on which the laser beam passing through first lens 61 is incident and a fourth plane 66 facing an optical recording medium.

In two-lens 60 of the above structure, the numerical aperture can be easily increased since the refractive power of the laser beam can be diffused.

In the objective lens of FIG. 16, relative inclination and offset in the lens axis occurs between first and second lenses 61 and 62 caused by error in the working accuracy of the lens holder that supports first and second lenses 61 and 62 or fixture error in fixing the lens. A method to adjust these errors is required.

Japanese Patent Laying-Open No. 7-220286 discloses a method of adjusting lens inclination in the so-called single lens. However, this method cannot accommodate adjustment of inclination between two lenses or offset in the lens axis between two lenses (decentration adjustment).

Japanese Patent Laying-Open No. 10-255304 discloses adjustment of inclination and decentration between two lenses employed as objective lens. However, this method induces the possibility of the focal point formed by the two lenses being altered due to change in the distance between the lenses during adjustment of inclination and decentration. In this case, spherical aberration occurs to degrade the performance of the objective lens.

SUMMARY OF THE INVENTION

The present invention is directed to solve the above problems, and an object is to provide an objective lens that allows inclination adjustment and decentration adjustment without altering the distance between two lenses, and that allows data to be written and read reliably, and a method of fabricating such an objective lens.

According to an aspect of the present invention, a fabrication method of an objective lens includes the steps of: (1) attaching a first lens to a first holder, (2) adjusting the optical axis of the second lens with respect to the optical axis of the first lens while sliding the second lens at the lens mount surface of the second holder, and attaching the second lens to the second holder so that the angle is substantially 0 degree, (3) forming contact between the first plane of the first holder perpendicular to the reference axis and the second plane of the second holder perpendicular to the reference axis, (4) performing decentration adjustment so that the optical axis of the first lens matches the optical axis of the second lens by sliding the second holder with respect to the first holder in a state where the first and second planes are in contact with each other, and (5) fixing the second holder subjected to decentration adjustment with respect to the first holder.

According to the fabrication method of an objective lens including the foregoing steps, decentration adjustment is performed with the first holder sliding with respect to the second holder. Since the first plane and the second plane functioning as sliding planes are perpendicular to the reference axis, the first and second lenses respectively move in a direction perpendicular to the reference axis. Therefore, the distance from the sliding plane of the first and second lenses is not altered during decentration adjustment. As a result, decentration adjustment can be carried out only by the aforementioned sliding as long as the angle between the optical axis of the first lens to the optical axis of the second lens is substantially 0 degree, i.e. in parallel.

Since the second lens is slid on the lens mounting surface of the second holder in attaching the second lens, the distance between the first and second lenses does not change in the attaching operation of the second lens. Therefore, the distance between the first and second lenses does not change during adjustment of inclination of the second lens.

As a result, the distance between the first and second lenses is always constant. Thus, an objective lens is provided that allows data to be read and written reliably.

The step of attaching the second lens to the second holder preferably includes the steps of directing a laser beam onto a reference plane provided in the first lens and observing the reflected laser beam to measure a first angle between the optical axis of the first lens and the reference axis, directing a laser beam onto a reference plane provided at the second lens and observing the reflected laser beam to measure a second angle between the optical axis of the second lens and the reference axis, and positioning the second lens by sliding the second lens on the lens mounting plane of the second holder so that difference between the first angle and the second angle is substantially 0 degree and attaching the second lens to the second holder.

By measuring the angle between the optical axis of the first lens and the reference axis and also the angle between the optical axis of the second lens and the reference axis using a laser beam, the angles can be measured in accuracy. The second lens can be positioned in further accuracy. As a result, an objective lens is provided that can read/write data reliably.

The method of performing decentration adjustment preferably includes the step of sliding the second holder to position the second holder so that the shape of the beam spots of the laser beams passing through the first lens and the second lens are point-symmetric.

Preferably, the objective lens is an objective lens for optical pickup.

According to another aspect of the present invention, an objective lens includes a first holder, a first lens, a second holder, and a second lens. The first holder has a first plane perpendicular to the reference axis. The first lens has an optical axis, and is attached to the first holder. The second holder has a second plane perpendicular to the reference axis, and is fixed with respect to the first holder in a state where the first and second lenses are in contact. The second lens has an optical axis identical in axis to the optical axis of the first lens, and is attached to the second holder.

According to the objective lens of the above structure, the first and second lenses are attached to the first and second holders, respectively, so that the distance between the first lens and the second lens in adjusting inclination will not be altered by adjusting the inclination of the second lens on the second holder.

Furthermore, since the first and second planes perpendicular to the reference axis are in contact, the distance between the first lens and the second lens during decentration adjustment will not change if the decentration adjustment is performed by sliding the second plane with respect to the first plane. The distance between the first lens and the second lens is constant, so that the position of the focal point will not change. As a result, an objective lens can be provided that allows data to be read/written reliably.

Preferably, the second holder includes a spherical concavity. The second lens has a spherical convexity having a radius of curvature identical to the radius of curvature of the spherical concavity. The second lens is positioned so that the convexity of the second lens fits into the concavity of the second holder.

Since the radius of curvature of the concavity of the second holder is identical to the radius of curvature of the convexity of the second lens, they fit together with no gaps. Therefore, the second lens is reliably positioned with respect to the second holder.

Preferably, at least one of the first and second lenses has a plane facing an optical recording medium.

Preferably, the objective lens is an objective lens for optical pickup.

According to a further aspect of the present invention, a fabrication method of an objective lens includes the steps of: (1) attaching a first lens to a first holder having a first plane so that the optical axis of the first lens is substantially perpendicular to the first plane, (2) attaching a second lens to a second holder having a second plane so that the optical axis of the second lens is substantially perpendicular to the second plane, (3) forming contact between the first and second planes, (4) rotating the second holder with respect to the first holder to adjust the angle of the optical axis of the second lens with respect to the optical axis of the first lens in the state where the first and second planes are in contact and minimizing the angle, and (5) performing decentration adjustment by sliding the second holder with respect to the first holder so that the optical axis of the first lens matches the optical axis of the second lens in the state where the first and second planes are in contact.

Preferably, the step of performing decentration adjustment includes the step of performing decentration adjustment so that the coma of the two-lens formed of first and second lenses is minimized.

Preferably, the step of attaching the first lens to the first holder includes the step of attaching the first lens to the first holder to form a first lens unit, and measuring the angle of the first plane to the reference plane of the first lens. The step of attaching the second lens to the second holder includes the step of attaching the second lens to the second holder to form a second lens unit, and measuring the angle of the second plane to the reference plane of the second lens. The step of forming contact between the first and second lenses includes the steps of selecting one first lens unit whose angle between the first plane and the reference plane of the first lens corresponds to a constant value out of a plurality of first lens units fabricated by the step of attaching the first lens, selecting one second lens unit whose angle between the second plane and the reference plane of the second lens corresponds to a predetermined value out of a plurality of second lens units fabricated by the step of attaching the second lens, and forming contact between the first and second planes of the selected first and second lens units.

Preferably, the objective lens is an objective lens for optical pickup.

According to still another aspect of the present invention, an objective lens includes a first lens, a second lens, a first holder, and a second holder. The first holder holds the first lens. The second holder holds the second lens. The first and second holders have first and second planes substantially perpendicular to the optical axis. The first plane is in contact with the second plane.

Preferably, at least one of the first and second lenses has a surface facing an optical recording medium.

Preferably, the objective lens is an objective lens for optical pickup.

According to a still further aspect of the present invention, a fabrication method of an objective lens includes the steps of (1) attaching a first lens to a first holder having a first plane, (2) attaching a second lens to a second holder having a second plane, (3) forming contact between the first plane and the second plane, (4) performing decentration adjustment so that the optical axis of the first lens matches the optical axis of the second lens by sliding the second holder with respect to the first holder in the state where the first plane and the second plane are in contact.

According to yet a further aspect of the present invention, a fabrication method of an objective lens includes the steps of (1) attaching a first lens to the first holder having a first plane so that the optical axis is substantially perpendicular to the first plane, (2) attaching the second lens to a second holder having a second plane so that the optical axis is substantially perpendicular to the second plane, (3) forming contact between the first plane and the second plane, and (4) rotating the second holder with respect to the first holder to adjust the angle of the optical axis of the second lens with respect to the optical axis of the first lens in the state where the first and second planes are in contact and minimizing the angle.

The foregoing and other objects, features, aspects and advantages of the present invention will become more apparent from the following detailed description of the

DESCRIPTION OF THE PREFERRED EMBODIMENTS

Embodiments of the present invention will be described hereinafter with reference to the drawings.

First Embodiment

Figure 1:
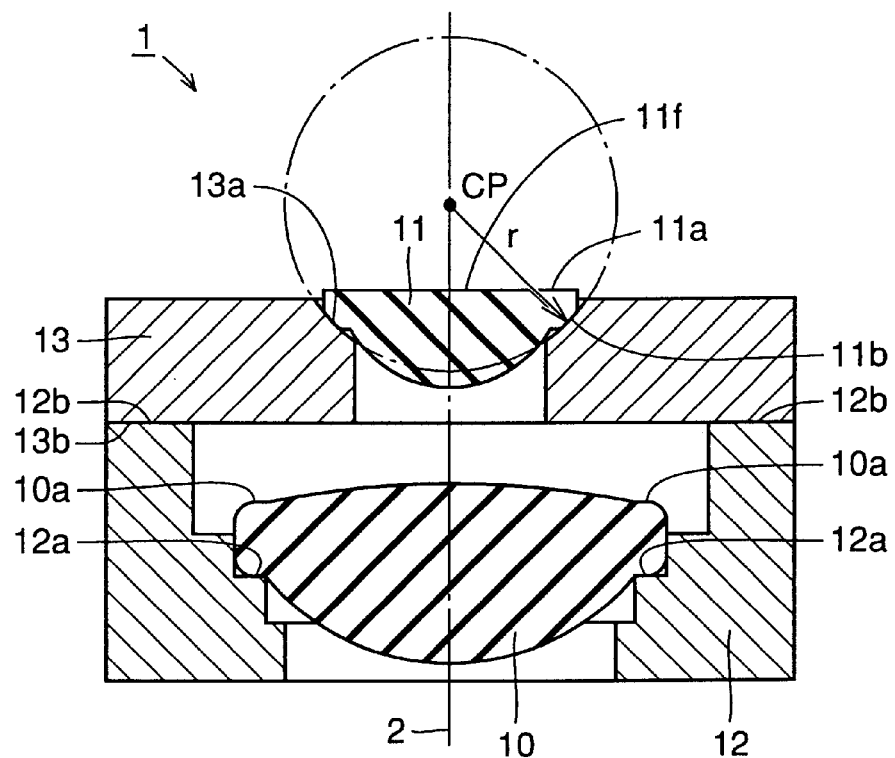
FIG. 1 is a sectional view showing an objective lens according to a first embodiment of the present invention.

Referring to FIG. 1, an objective lens 1 according to a first embodiment of the present invention includes a first lens 10, a first holder 12, a second lens 11, and a second holder 13.

First holder 12 includes a flat plane 12a on which first lens 10 is to be mounted, and a flat plane 12b which is a first plane on which second holder 13 is to be mounted. Flat planes 12a and 12b are perpendicular to a reference axis 2 indicated by a chain doted line. Flat planes 12a and 12b are processed at high accuracy to form contact with other members.

First lens 10 is mounted on flat plane 12a of first holder 12. First lens 10 and first holder 12 are fixed by means of an adhesive agent. First lens 10 is formed with a plane 10a as a reference plane to measure inclination thereof.

Second holder 13 includes a sphere 13a serving as a lens mount plane on which second lens 11 is to be mounted, and a plane 13b serving as a second plane in contact with first holder 12. Plane 13b is in contact with flat plane 12b, and formed perpendicular to reference axis 2. Plane 13b as well as flat plane 12b are formed in high accuracy. The center point CP of sphere 13a is located on an optical axis 2, and sphere 13a has a radius of curvature r.

Second lens 11 is mounted on sphere 13a of second holder 13. A sphere 11b of second lens 11 in contact with sphere 13a has a radius of cuivature r, identical to the radius of curvature of sphere 13a. Sphere 11b is entirely in contact with sphere 13a. It is desirable that the optical axes of the first and second lenses 10 and 11 are identical to reference axis 2. Second lens 11 has a face 11f facing an optical recording medium.

The contact between sphere 11b and sphere 13a will be described in detail hereinafter.

Figure 2:
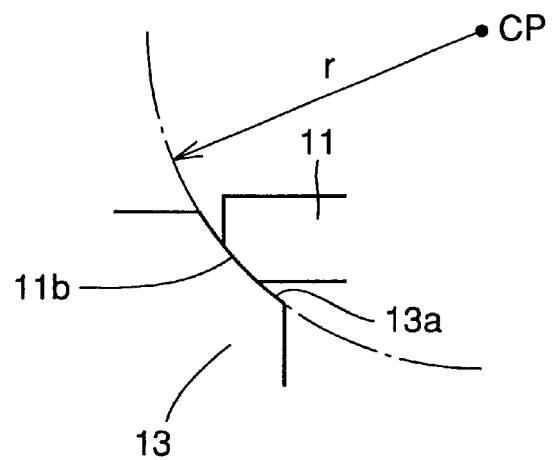
FIG. 2 is an enlarged view of the contact between the second lens and the second holder of FIG. 1.

Referring to FIG. 2, sphere 13a of second holder 13 and sphere 11b of second lens 11 have the same radius of curvature r. Sphere 13a forms a concavity whereas sphere 11b forms a convexity.

A method of fabricating the objective lens of FIG. 1 will be described hereinafter.

Referring to FIG. 1, first lens 10 is placed on flat plane 12a of first holder 12. First lens 10 is fixed adhesively to first holder 12.

Figure 3:
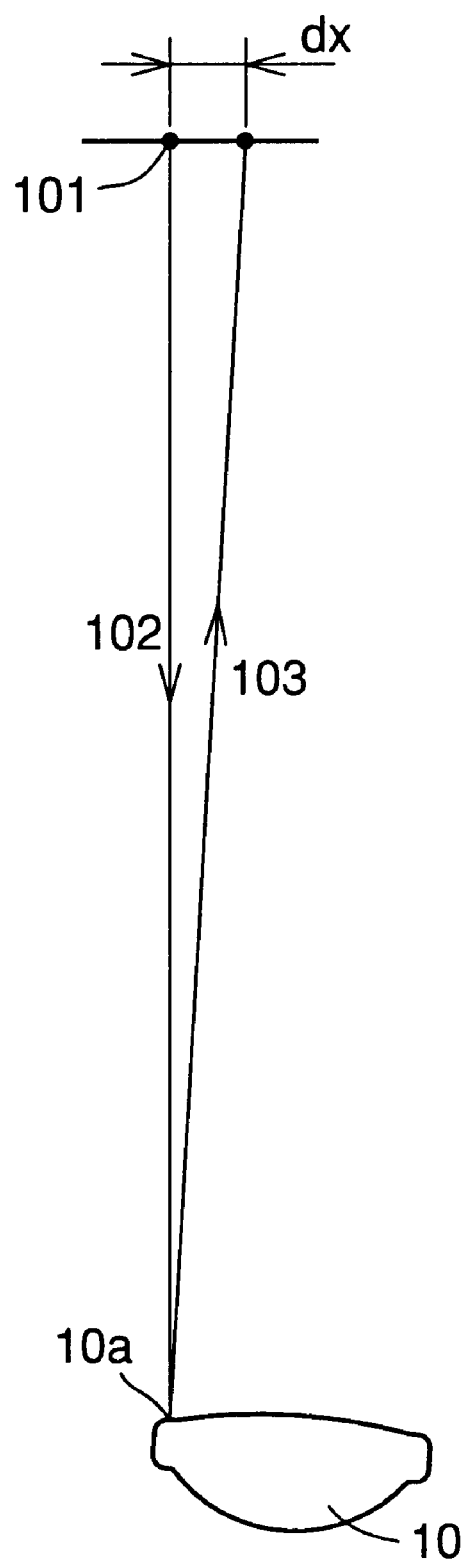
FIGS. 3 and 4 are schematic diagrams showing a first step of a fabrication method of the objective lens of FIG. 1.

Referring to FIG. 3, a laser beam 102 emitted from a laser light source 101 is directed onto a plane (edge plane) 10a of first lens 10. Then, the position where reflected laser beam 103 reaches is measured. When the optical axis of first lens 10 is inclined with respect to reference axis 2, the angle between the optical axis of first lens 10 and reference axis 2 is calculated by the distance dx between laser light source 101 and reflected light 103.

Figure 4:
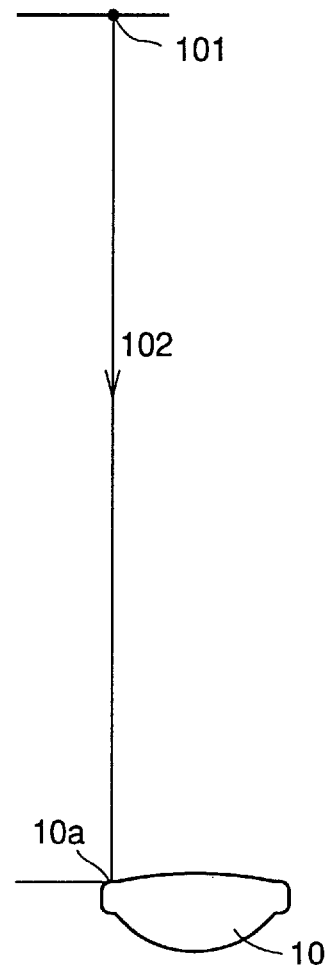

Referring to FIG. 4, when the angle between the optical axis of first lens 10 and reference axis 2 is 0°, laser beam 102 emitted from laser light source 101 is reflected at plane 10a to return back to laser light source 101.

Figure 5:
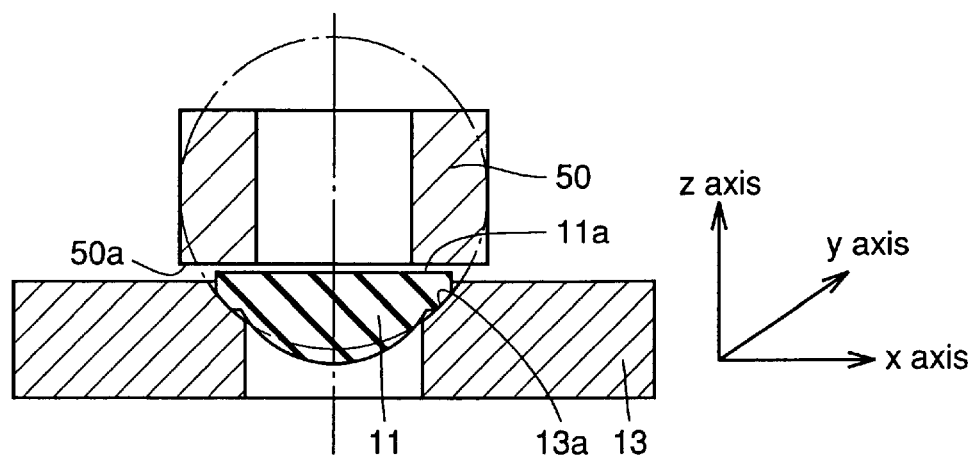
FIGS. 5 and 6 are sectional views of second and third steps, respectively, of the fabrication method of the objective lens of FIG. 1.

Referring to FIG. 5, second lens 11 is placed on second holder 13. In a manner similar to that shown in FIG. 3, a laser beam is directed onto a plane (edge plane) 11a of second lens 11. By reflection of this laser beam at plane 11a, the angle between reference axis 2 and the optical axis of second lens 11 can be obtained from the difference between the reflected laser beam and the incident laser beam.

A jig 50 is positioned above second lens 11. Jig 50 has a plane 50a in contact with plane 11a of first lens 11. Jig 50 is positioned by means of an arm, capable of parallel movement in a direction parallel to the x axis, a direction parallel to the y axis, and a direction parallel to the z axis of FIG. 5. Jig 50 is also capable of a rotary movement about the x axis and a rotary movement about the y axis.

Jig 50 is rotated about the x axis and the y axis so that the angle of plane 50a of jig 50 to reference axis 2 matches the angle between the optical axis of first lens 10 and reference axis 2.

Then, jig 50 is moved in the direction of the x axis and the y axis to position jig 50 right above second lens 11. Next, jig 50 is shifted in the direction of the z axis to bring plane 50a in contact with plane 11a. Accordingly, second lens 11 slides on sphere 13a of second holder 13 so that plane 11a of second lens 11 is completely in contact with plane 50a of jig 50.

Thus, the angle between the optical axis of second lens 11 and reference axis 2 becomes equal to the angle between plane 50a and reference axis 2, and also equal to the angle between the optical axis of first lens 10 and reference axis 2. Second lens 11 and second holder 13 are fixed with an adhesive agent when the adjustment of inclination of second lens 11 is completed.

According to the steps shown in FIGS. 3–5, the angle between reference axis 2 and the optical axis of first lens 10 becomes equal to the angle between reference axis 2 and second lens 11, whereby the optical axis of first lens 10 becomes parallel to the optical axis of second lens 11. Decentration adjustment set forth in the following is performed so that the two optical axes are coincident with each other.

Figure 6:
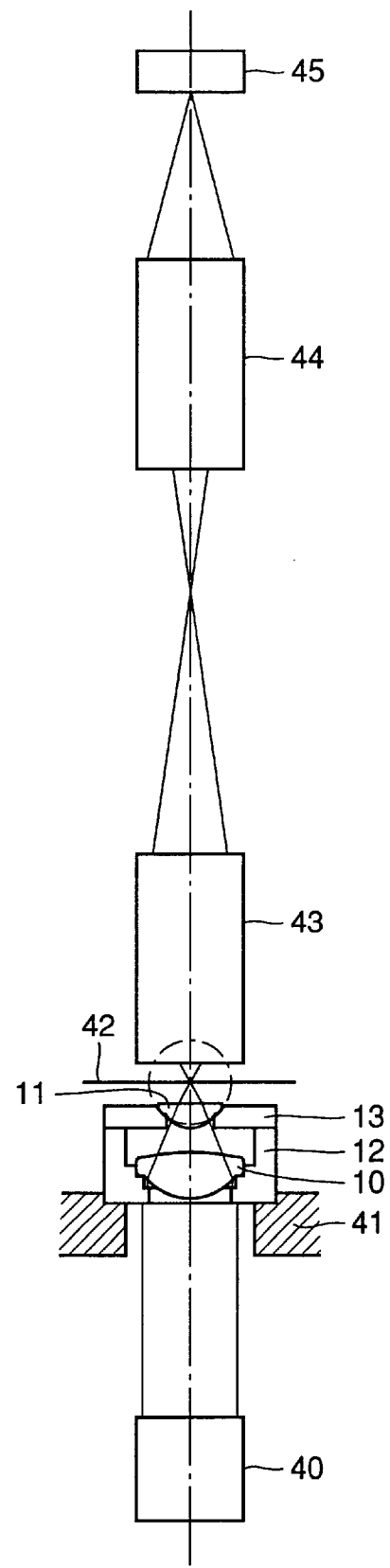

Referring to FIG. 6, first and second holders 12 and 13 in contact with each other are placed on a base plate 41 for decentration adjustment. Laser light source 40 from which collimated laser beam is emitted is provided beneath base plate 41. Cover glass 42 having a thickness corresponding to the transparent protection layer of a recording medium is provided above second holder 13.

An objective lens 43 for a beam spot observation device to enlarge the collected beam spot is provided above glass cover 42. An imaging lens 44 to form an image is provided above objective lens 43. A CCD (Charge Coupled Device) 45 to observe an image formation plane obtained by passage through imaging lens 44 is provided above imaging lens 44. The magnification of objective lens 43 for the beam spot observation device is ×100, and the magnification of imaging lens 44 is ×20.

Using such an apparatus, the collimated laser beam from laser light source 40 is emitted towards first lens 10. The laser beam collected at first lens 10 is further collected at second lens 11. The laser beam forms an image on cover glass 42.

The laser beam diverges as a function of distance from cover glass 42 to enter objective lens 43. Following passage through objective lens 43, the laser beam is further collected to enter imaging lens 44. The laser beam output from imaging lens 44 is collected on CCD 45. The image obtained by the collected light is sensed by CCD 45.

At the current stage, second holder 13 is slid with respect to first holder 12, and the image obtained on CCD 45 is observed. Coincidence between the optical axis of first lens 10 and the optical axis of second lens 11 is established when the image obtained on CCD 45 includes ring shape and has a shape that is point-symmetric. The slide of second holder 13 is terminated at this time point to fix second holder 13 to first holder 12 adhesively. Positioning of high accuracy is allowed by using a micro feed mechanism such as a micrometer in the sliding operation of second holder 13.

Inclination adjustment and decentration adjustment of the objective lens are completed according to the above-described steps. Thus, an objective lens positioned at high accuracy (objective lens hold apparatus) is completed.

According to such an objective lens and a fabrication method thereof, adjustment is carried out in a state where second lens 11 is placed on second holder 13 in adjusting inclination of second lens 11. Since second lens 11 is placed on second holder 13 and slides on sphere 13a during the adjustment, the distance between second lens 11 and first lens 10 provided thereunder will not change.

In decentration adjustment, second holder 13 is slid with respect to first holder 12 as shown in FIG. 6. Since flat plane 12a of first holder 12 is in contact with plane 13a of second holder 13 and perpendicular with respect to reference axis 2, second lens 11 moves on a plane perpendicular to reference axis 2 during the sliding motion. Therefore, the distance between first lens 10 and second lens 11 will not change.

Accordingly, the position of the synthesized focal point will not change since the distance between first lens 10 and second lens 11 is not altered in any of the steps. As a result, an objective lens of high accuracy, allowing information to be read/written reliably can be provided.

More specifically, wave-front aberration exceeding the tolerance required in a lens, for example wave-front aberration exceeding 0.04 λrms (root mean square), will not occur by usage of the two-lens.

Since second lens 11 and second holder 13 form contact with each other through spheres 11b and 13a having the same radius of curvature, the contacting area therebetween is increased to ensure fixture of second lens 11 to second holder 13. By virtue of spheres 11b and 13a, the distance between first and second lenses 10 and 11 will not be altered.

Second Embodiment

Figure 7:
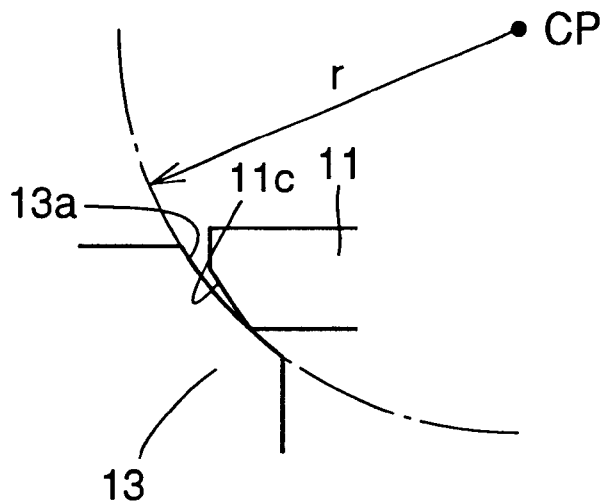
FIGS. 7 and 8 are enlarged views of the contact between the second lens and the second holder according to a second embodiment of the present invention.
Figure 8:
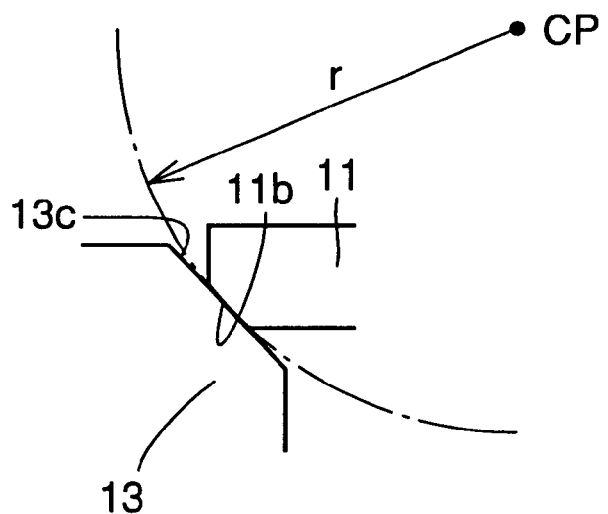

In contrast to the previous first embodiment in which sphere 11b of first lens 11 and sphere 13a of second holder 13 are in contact with each other, a second lens 11 according to a second embodiment of the present invention shown in FIG. 7 includes a tapered plane 11c which is a flat surface whereas second holder 13 has a sphere 13a similar to that of the first embodiment. In the second embodiment, line-contact is established between second lens 11 and second holder 13.

Alternatively, second lens 11 may have a sphere 11b whereas second holder 13 has a tapered plane 13c which is a flat surface. Line-contact is established between second lens 11 and second holder 13.

By the above-described structure, advantages as of the first embodiment can be achieved.

The above-described embodiments are capable of various modification. For example, the lens may be supported by a member having the above-described sphere or tapered plane, and the holder provided to come into contact with the member in contrast to the structure of the first and second embodiments in which the lens itself is brought into contact with the holder.

In the foregoing modification, a metal component can be employed as the member that holds the lens. Accordingly, the metal component can be worked in high accuracy and also increased in strength. There is an. advantage that the component is not easily scratched during the sliding motion for inclination adjustment.

In contrast to the structure of the first embodiment in which decentration adjustment between the lenses is performed while observing the shape of the beam spot, a structure in which decentration adjustment between the lens is performed by measuring the wave-front aberration using an interferometer can be implemented.

In the above embodiment, respective lens are fixed to two holders brought into contact. A space adjustment mechanism with respect to the direction of the optical axis can be provided for the first or second holder. The space adjustment mechanism disclosed in Japanese Patent Laying-Open No. 10-255290 can be employed therefor.

Accordingly, displacement of lenses caused by the processing error of the sphere or any error generated in the fixture using an adhesive agent can be adjusted.

In the first embodiment, the center of the sphere of the second lens is coincident with the center of the sphere of the second holder. Furthermore, it is preferable to have this center coincide with the focal point obtained by the two lenses. In this case, the shift of the position of the synthesized focal point obtained by the two lenses can be minimized in the rotation of the second lens during the inclination adjustment if the decentration between the two lenses has been adjusted.

In the case where one of the second lens and the second holder has a sphere and the other has a tapered plane to form line-contact, a similar advantage can be obtained by establishing coincidence between the rotary center of the second lens and the synthesized focal point of the two lenses.

Also, a structure can be implemented in which the second lens has a complete or substantial hemispherical shape and the second holder has a concavity of a sphere shape fitting the sphere or hemisphere of the second lens, and in which the center of the sphere of the second lens and the sphere of the concavity matches the focal point of the lens. In this case, a sphere on which the lens is to be placed does not have to be formed.

Third Embodiment

Figure 9:
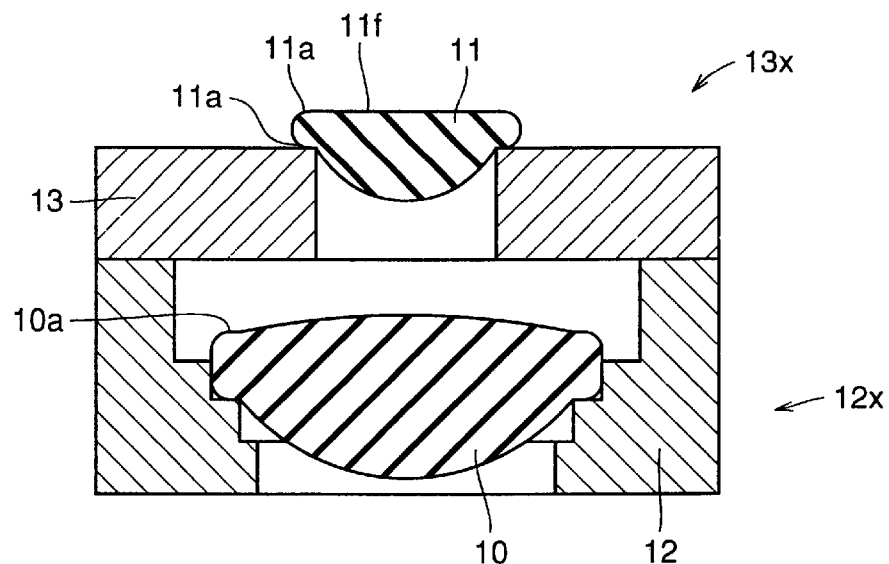
FIG. 9 is a schematic diagram showing a structure of an objective lens for optical pickup according to an embodiment of the present invention.

Referring to FIG. 9, an objective lens according to a third embodiment of the present invention includes a first lens 10 and a second lens 11 of a two-lens, a first holder 12 holding the first lens, and a second holder 13 holding the second lens. The two-lens of FIG. 1 functions as the objective lens.

The structure of first holder 12 supporting first lens 10 will be described with reference to FIG. 10. First holder 12 supports first lens 10 at a flat plane 12a, and forms contact with second holder 13 via a flat plane 12b (contact plane) as the first plane.

Flat plane 12a and flat plane 12b are finished in favorable profile irregularity (for example, Rmax≦5 μm). Flat planes 12a and 12b are formed with a degree of parallelization of some level (for example, degree of parallelization of approximately 3 minutes).

In the case where the two-lens is employed as the objective lens for pickup, first holder 12 is configured so as to also function as an aperture defining the incident beam diameter for the laser beam to enter first lens 10.

Figure 11:
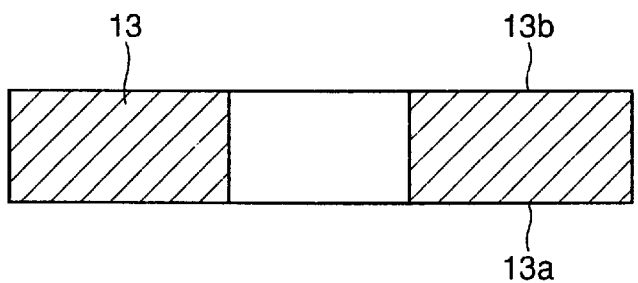

The structure of second holder 13 supporting second lens 11 will be described with reference to FIG. 11. Second holder 13 supports second lens 11 with a flat plane 13a, and forms contact with first holder 12 through a flat plane 13a (contact plane) as the second plane.

Flat plane 13a and flat plane 13b are finished in favorable profile irregularity (for example, Rmax≦5 μm). Flat planes 13a and 13b are formed with a degree of parallelization of some level (for example, degree of parallelization of approximately 3 minutes).

In the case where the two-lens is employed as an objective lens for pickup, the diameter of the incident laser beam is set to the required size by passage of the laser beam output from a laser light source not shown through first holder 12 also serving as an aperture. The laser beam output from the aperture portion of first holder 12 sequentially passes through first lens 10 and second lens 11 to achieve focus with the synthesized focal point of the two lenses.

In the case where the relative position of the two lenses of the two-lens cannot be positioned accurately, there is a possibility of the distance between first and second lenses 10 and 11 differing from the designed value and occurrence of inclination or decentration. If the distance of second lens 11 with respect to first lens 10 changes or if inclination or decentration occurs, wave-front aberration exceeding the tolerable range required for the single lens, for example wave-front aberration exceeding 0.04 λrms, will occur. It is difficult to form the two-lens so that the lens distance, decentration and inclination is within the tolerable range with the profile accuracy of the lens and holder. It is necessary to carry out adjustment in determining the relative position of the lenses.

A method of fabricating a two-lens characteristic of the present invention will be described hereinafter.

[Step 1]

First lens 10 is adhesively fixed with respect to first holder 12. Inclination is measured taking advantage of reflectance at flat plane 10a of first lens 10. As to the inclination measurement, a laser beam is directed onto a flat plane 10a of the lens from a remote source and the position of the laser beam reflected is observed to identify the direction and how much in angle the edge surface of the flat plane of the lens is inclined.

Although the contact plane between the lens and holder and the contact plane of the holders with respect to each other are processed with favorable degree of parallelization, an error of approximately 1–2 minutes will occur as the processing error. Furthermore, there is a possibility of the lens being fixed inclined with respect to the holder due to the fixture error caused by variation in the hardening and shrinkage of the adhesive agent in fixing the lens to the holder.

[Step 2]

Second lens 11 is fixed adhesively to second holder 13, and second holder 13 is mounted on first holder 12. Taking advantage of the reflection at flat plane 11a of second lens 11, inclination of second lens 11 is measured in a manner similar to that of measuring inclination of first lens 10. Second lens 11 is rotated together with second holder 13 about the optical axis so that the relative inclination with respect to flat plane 10a of first lens 10 is minimized.

Figure 12:
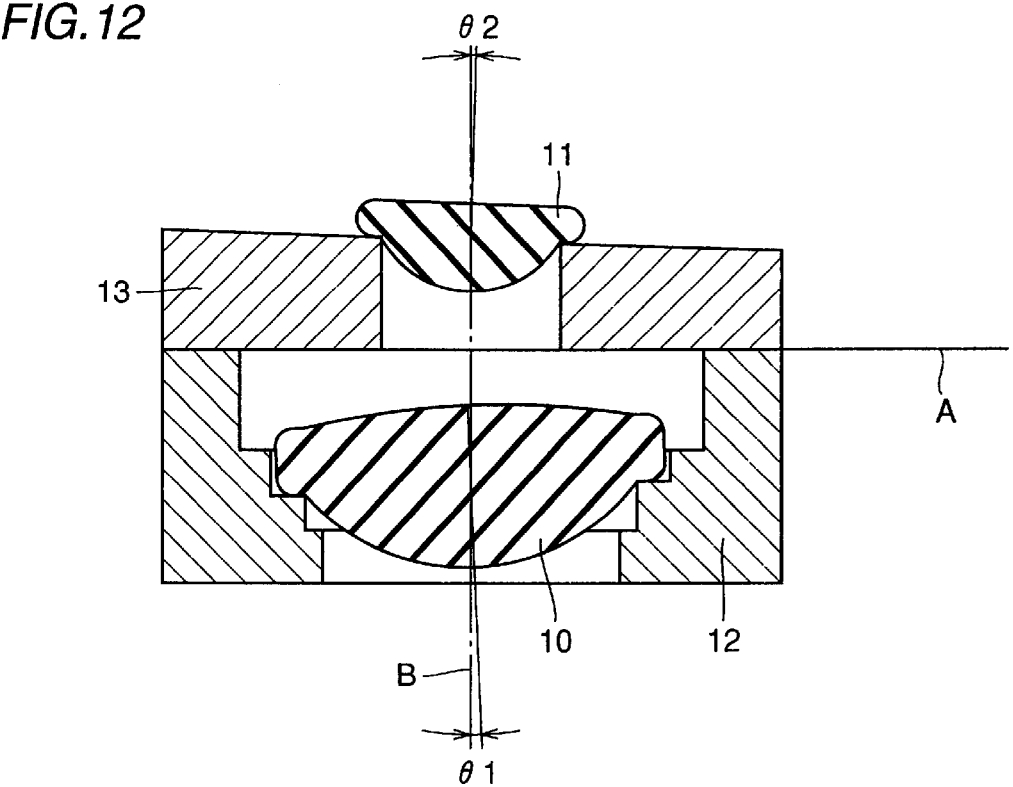
FIG. 12 is a diagram to describe the case where there is inclination between two lens.
Figure 13:
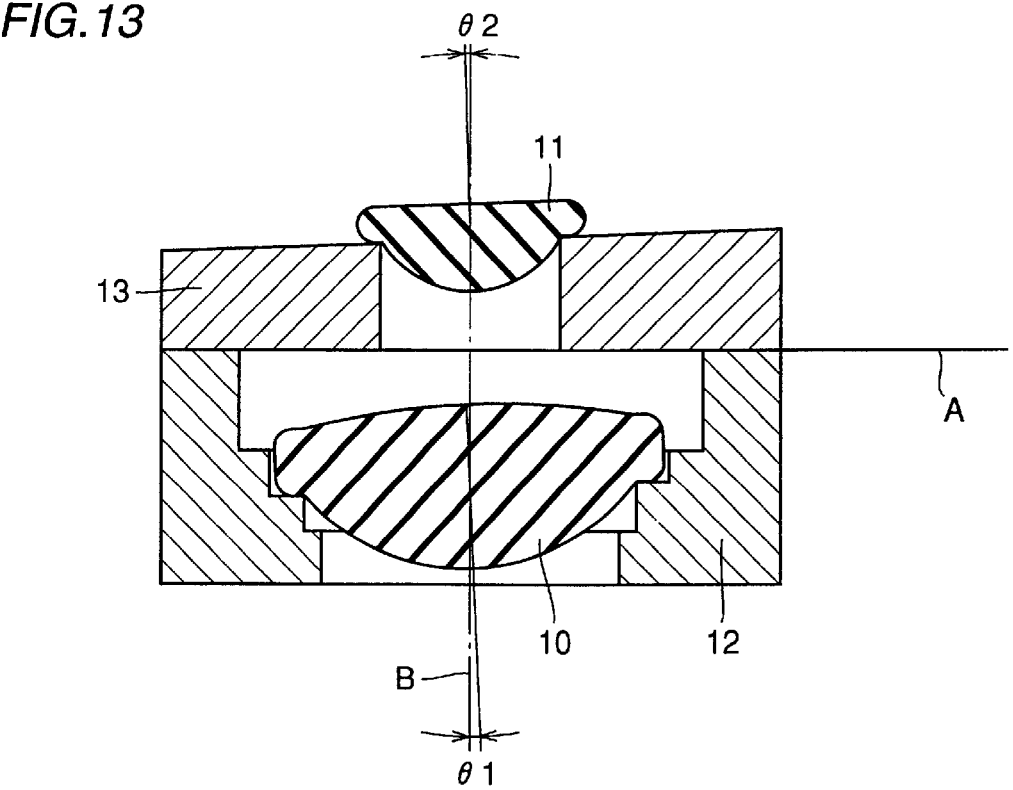
FIG. 13 is a diagram to describe the manner of correcting inclination between lenses according to rotary adjustment of the present invention.

Inclination adjustment will be described hereinafter with reference to FIGS. 12 and 13. In FIGS. 12 and 13, plane A is the contact plane between first holder 10 and second holder 11. Axis B is an axis perpendicular to plane A. The angle between the optical axis of first lens 10 and axis B is θ1. The angle between the optical axis of second lens 11 and axis B is θ2. Since angles θ1 and θ2 are in an opposite direction with respect to axis B, the relative angle between the optical axis of first lens 10 and the optical axis of second lens 11 is θ1+θ2.

Figure 10:
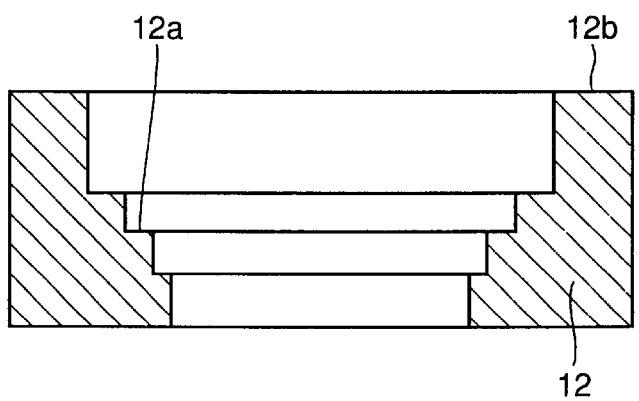
FIGS. 10 and 11 are enlarged schematic views of the structure of first and second holders, respectively, of FIG. 1.

According to the inclination adjustment by rotating second holder 11 about axis B (in this case rotation of 180°), angles θ1 and θ2 are angled in the same direction with respect to axis B as shown in FIG. 10, so that the relative inclination of the optical axis of first lens 10 and the optical axis of second lens 11 is |θ1−θ2|. In other words, when the angle of the optical axis of first lens 10 is θ1 and the angle of the optical axis of second lens 11 is θ2 with respect to axis B that is perpendicular to the contact plane A of the two holders, the relative inclination of first and second lenses 10 and 11 become greatest when the directions of angles θ1 and θ2 are opposite with respect to axis B, i.e. the angle of θ1+θ2. The relative inclination is smallest when angles θ1 and θ2 with respect to axis B are identical, i.e. the angle is |θ1−θ2|. For example, when there is an inclination of 5 minutes for θ1 and 3 minutes for θ2, the relative inclination of first lens 10 and second lens 11 can be suppressed to 2 minutes by carrying out rotary adjustment.

By measuring the inclination between the contact plane of the holders and the flat plane of the lens with respect to first lens 10 fixed adhesively to first holder 12 and second lens 11 fixed adhesively to second holder 13 and using the selected pair of substantially equal inclination, inclination between the two lens can be rendered close to 0 by rotary adjustment.

More specifically, in attaching first lens 10 to first holder 12, a plurality of first lens units 12x are formed with first lens 10 attached to first holder 12 to measure the angle between flat plane 12b and plane 10a of first lens 10 for each of the plurality of first lens units 12x. In attaching second lens 11 to second holder 13, a plurality of second lens units 13x are formed with second lens 11 attached to second holder 13 to measure the angle between plane 13a and flat plane 11a of second lens 11 for each of the plurality of second lens units 13x. In forming contact between planes 12b and 13a, one first lens unit 12x whose angle between flat plane 12b and plane 10a of first lens 10 corresponds to a predetermined value is selected from the plurality of first lens units 12x. Also, one second lens unit 13x whose angle between plane 13a and plane 11a of second lens 11 corresponds to a predetermined value is selected from the plurality of second lens units 13x. Planes 12b and 13a of the selected first and second lens units 12x and 13x are brought into contact.

[Step 3]

Decentration between the two lenses of the two-lens is adjusted. In the current stage, adjustment is carried out while observing the shape of the beam spot.

Figure 14:
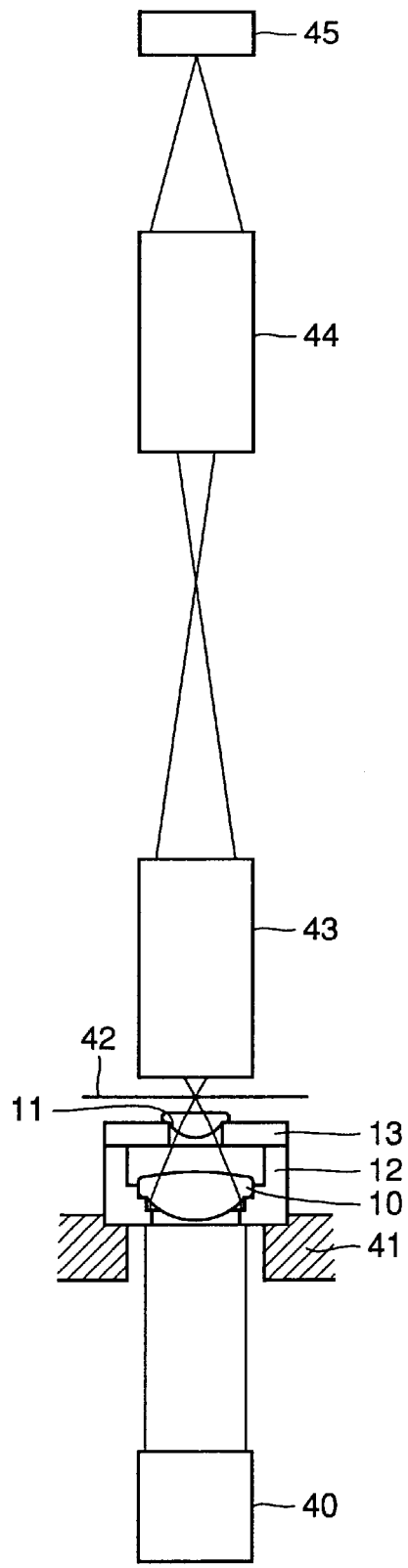
FIG. 14 is a schematic diagram showing a beam spot observation system for decentration adjustment.

The incident laser beam on the aperture side of first holder 12 travels through the two-lens to have the shape of the converged beam spot observed. The observation system of the beam spot will be described hereinafter with reference to FIG. 14. The observation system includes a laser light source 40 from which a collimated laser beam is output, a base plate 41 holding the two-lens for adjustment, cover glass 42 having a thickness corresponding to the transparent protection layer of the recording medium, a beam spot observation objective lens 43 to enlarge the collected beam spot, an imaging lens 44 to form an image on the image formation plane of CCD 45, and CCD 45 to sense the enlarged beam shape. Decentration adjustment is performed by collecting the laser beam emitted from laser light source 40 through the two-lens, followed by passage through cover glass 42 to form an image. After image formation, the diverging laser beam is focused by beam spot observation objective lens 43, followed by passage through image sensing lens 44 to form an image on the image formation plane of CCD 45. By selecting beam spot observation objective lens 43 and imaging lens 44 of ×100 magnification and ×20 magnification, respectively, with a numerical aperture of at least 0.85, the beam spot on the image formation plane of CCD 45 can be enlarged to a size appropriate for visual conformation to observe the shape.

Decentration adjustment between the two lenses is effected by the parallel movement while sliding lens holder 12 with respect to lens holder 11 so that the coma is reduced while viewing the shape of the beam spot using the observation system. Positioning of high accuracy is allowed by using a micro feed mechanism such as a micrometer in carrying out the parallel movement.

[Step 4]

Second holder 13 is fixed adhesively with respect to first holder 12 when decentration adjustment of the lens is completed.

According to the above-described procedure, the two lenses can be assembled with high accuracy as to the inclination and decentration of the two-lens.

In the present embodiment, a structure is implemented in which lens decentration is adjusted while viewing the shape of the beam spot. However, a structure can be implemented of decentration adjustment by measuring the wave-front aberration using an interferometer.

The lens barrel of the present embodiment is absent of the mechanism to adjust the lens distance. Therefore, the optimum lens distance and shape of each holder corresponding to the smallest spherical aberration are identified with respect to the pair of two lenses, and a combination of holders and lenses whose distance of the lens abutting plane with the holder is substantially equal to the foregoing optimum lens distance are selected for assembly and adjustment. Thus, a two-objective lens reduced in error of lens distance, lens inclination, and decentration can be produced. As an alternative to measuring the optimum lens distance, the focal length of respective lens can be measured to select the optimum combination of the holders and the lens.

Also, by identifying in advance the optimum lens distance and the shape of each holder corresponding to the smallest spherical aberration with respect to the pair of two lenses and adjusting the lens distance in the step of adhesively fixing the lens to the holder, a two-objective lens reduced in error of lens distance, lens inclination, lens decentration can be produced.

Figure 15:
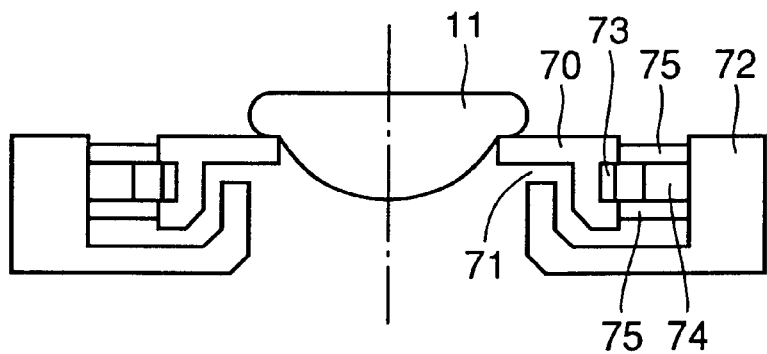
FIG. 15 is a schematic diagram to describe a space adjustment mechanism of a two-lens.
Figure 16:
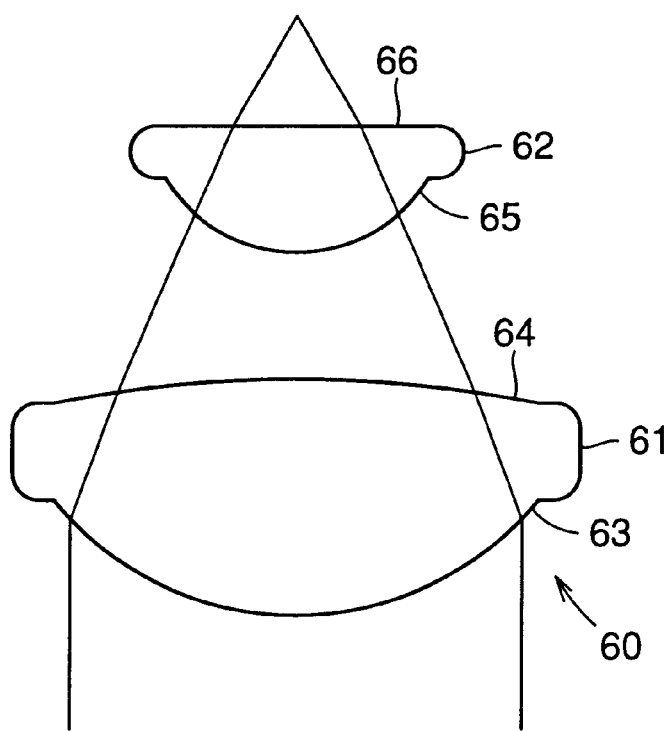
FIG. 16 is a schematic diagram of an objective lens formed of the conventional two-lens.

The present embodiment has a structure in which the lens are fixed respectively to the two holders. By providing a space adjustment mechanism towards the direction of the optical axis of the two-lens in the first or second holder (disclosed in Japanese Patent Laying-Open No. 10-255290, for example), displacement in the lens distance caused by the error occurring in the lens and holder processing tolerance and during fixture of the adhesive agent can be accommodated. A structure of providing second holder 13 with a distance adjustment mechanism, for example, will be described with reference to FIG. 15.

The distance adjustment mechanism includes a substantially cylindrical bobbin 70 holding second lens 11, a yoke 72 provided with a cavity with respect to bobbin 70, a coil 73 wound around the circumference of bobbin 70, a magnet 74 attached to yoke 72 and arranged apart from coil 73, and a spring 75 mechanically coupling bobbin 70 and yoke 72. By the Lorentz's force generated between coil 73 and magnet 74, second lens 11 supported resiliently with a degree of freedom in the direction of the optical axis can be driven in displacement. In other words, the distance between the two lens can be adjusted.

The configuration of the lens holder is not limited to that described in the present embodiment. Any configuration that allows the decentration and inclination adjustment between the two lens to be carried out by a parallel movement and rotary movement on one plane can be employed.

According to the method of adjusting the optical pickup objective lens of the present invention, inclination and decentration of two lenses can be adjusted easily and accurately.

A two-objective lens favorable in wave-front aberration can be obtained by adjusting decentration between the lenses so that the coma of the two lenses is minimized.

Furthermore, by measuring the inclination between the contact faces of the holder with respect to each other and the lens for each lens holder and using the selected lens units of a combination that has substantially equal inclination (lens holder+lens), inclination between the two lenses can be rendered close to 0.

According to the optical pickup objective lens of the present invention, triaxial adjustment is allowed in a plane where holders form contact with each other as to the relative position adjustment between the lenses.

According to a fabrication method of an objective lens of the present invention, an objective lens that allows data to be read/written reliably can be provided.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A fabrication method of an objective lens comprising the steps of:
   attaching a first lens to a first holder,
   adjusting an angle of an optical axis of a second lens with respect to an optical axis of the first lens while sliding the second lens on a lens mounting plane of a second holder, and attaching said second lens to said second holder so that said angle is substantially 0°,
   forming contact between a first plane of said first holder perpendicular to a reference axis and a second plane of said second holder perpendicular to the reference axis,
   sliding said second holder with respect to said first holder in a state where said first plane and said second plane are in contact to carry out decentration adjustment so that the optical axis of said first lens matches the optical axis of said second lens, and
   fixing said second holder subjected to decentration adjustment with respect to said first holder.

2. The fabrication method of an objective lens according to claim 1, wherein said step of attaching said second lens to said second holder includes the steps of
   directing a laser beam onto a reference plane provided at said first lens and observing the laser beam reflected to measure a first angle between the optical axis of said first lens and the reference axis,
   directing a laser beam onto a reference plane provided at said second lens and observing the laser beam reflected to measure a second angle between the optical axis of said second lens and the reference axis, and
   positioning said second lens by sliding said second lens on a lens mounting plane of said second holder so that difference between said first angle and said second angle is approximately 0°, and attaching said second lens to said second holder.

3. The fabrication method of an objective lens according to claim 1, wherein said step of performing decentration adjustment includes the step of determining position of said second holder by sliding said second holder so that a shape of a beam spot of the laser beam passed through said first and second lenses is point-symmetric.

4. The fabrication method of an objective lens according to claim 1, wherein said objective lens is an objective lens for optical pickup.

5. An objective lens comprising:
   a first holder having a first plane perpendicular to a reference axis,
   a first lens having an optical axis and attached to said first holder,
   a second holder having a second plane perpendicular to the reference axis, and fixed with respect to said first holder in a state where said first and second planes are in contact, and
   a second lens having an optical axis identical in axis to the optical axis of said first lens, and attached to said second holder,
   wherein said second holder has a spherical concavity and said second lens has a spherical convexity of a radius of curvature identical to the radius of curvature of said spherical concavity, said second lens positioned so that the convexity of said second lens fits the concavity of said second holder.

6. The objective lens according to claim 5, wherein at least one of said first lens and said second lens has a surface facing an optical recording medium.

7. The objective lens according to claim 5, wherein said objective lens is an objective lens for optical pickup.

8. A fabrication method of an objective lens comprising steps of:
   attaching a first lens to a first holder having a first plane so that an optical axis of the first lens is substantially perpendicular to said first plane,
   attaching a second lens to a second holder having a second plane so that an optical axis of said second lens is substantially perpendicular to said second plane,
   forming contact between said first plane and said second plane,
   rotating said second holder with respect to said first holder to adjust an angle of the optical axis of said second lens with respect to the optical axis of said first lens in a state where said first and second planes are in contact, and minimizing the angle, and
   performing out decentration adjustment by sliding said second holder with respect to said first holder so that the optical axis of said first lens matches the optical axis of said second lens in a state where said first and second planes are in contact.

9. The fabrication method of an objective lens according to claim 8, wherein said step of performing decentration adjustment includes the step of performing decentration adjustment so that coma of a two-lens formed of said first lens and said second lens is minimized.

10. The fabrication method of an objective lens according to claim 8, wherein said step of attaching said first lens to said first holder includes the step of attaching said first lens to said first holder to form a first lens unit, and measuring an angle between said first plane and a reference plane of said first lens,
   wherein said step of attaching said second lens to said second holder includes the step of attaching said second lens to said second holder to form a second lens unit, and measuring an angle between said second plane and a reference plane of said second lens,
   wherein said step of forming contact between said first plane and said second plane includes the steps of
      selecting one said first lens unit whose angle between said first plane and the reference plane of said first lens corresponds to a predetermined value out of a plurality of said first lens units fabricated according to said step of attaching said first lens,
      selecting one said second lens unit whose angle between said second plane and the reference plane of said second lens corresponds to said predetermined value out of a plurality of said second lens units fabricated according to said step of attaching said second lens, and
      forming contact between said first plane and said second plane of said selected first and second lens units.

11. The fabrication method of an objective lens according to claim 8, wherein said objective lens is an objective lens for optical pickup.

12. An objective lens comprising:
   a first lens,
   a second lens,
   a first holder holding said first lens, and
   a second holder holding said second lens,
   wherein said first holder and said second holder include first and second planes substantially perpendicular to an optical axis, said first plane forming contact with said second plane; and wherein said first and said second lens are separated by a distance such that one or more inclination adjustments and one or more decentration adjustments can be made to the objective lens.

13. The objective lens according to claim 12, wherein at least one of said first lens and said second lens has a surface facing an optical recording medium.

14. The objective lens according to claim 12, wherein said objective lens is an objective lens for optical pickup.

15. A fabrication method of an objective lens comprising the steps of:

attaching a first lens to a first holder having a first plane, attaching a second lens to a second holder having a second plane, forming contact between said first plane and said second plane, and performing decentration adjustment by sliding said second holder with respect to said first holder so that an optical axis of said first lens matches an optical axis of said second lens in a state where said first and second planes are in contact.

16. A fabrication method of an objective lens comprising the steps of:

attaching a first lens to a first holder having a first plane so that an optical axis of said first lens is substantially perpendicular to said first plane, attaching a second lens to a second holder having a second plane so that an optical axis of said second lens is substantially perpendicular to said second plane, forming contact between said first plane and said second plane, and rotating said second holder with respect to said first holder to adjust an angle between the optical axis of said first lens and the optical axis of said second lens in a state where said first and second planes are in contact, and minimizing the angle.

* * * * *